United States Patent [19]

Henson

[11] Patent Number: 4,856,996
[45] Date of Patent: Aug. 15, 1989

[54] CYCLING PEDAL STROKE MONITORING SYSTEM

[76] Inventor: Jerry H. Henson, 4775 Annistown Rd., Stone Mountain, Ga. 30087

[21] Appl. No.: 211,421

[22] Filed: Jun. 24, 1988

[51] Int. Cl.⁴ .............................................. G09B 9/00
[52] U.S. Cl. .................................................... 434/61
[58] Field of Search ............................ 434/61; 272/73

[56] References Cited

U.S. PATENT DOCUMENTS 3,676,195 10/1973 Dimick .......................... 272/DIG. 6
4,071,892 1/1978 Genzling ............................... 434/61
4,443,008 4/1984 Shimano ............................... 434/61

Primary Examiner—Leo P. Picard
Attorney, Agent, or Firm—James B. Middleton

[57] ABSTRACT

A pedalling monitor allows a cycle rider to determine proper pedalling while riding in normal fashion. A slip ring indicates pedal position, and a switch actuated by the rider's foot indicates whether the rider is pushing or pulling. The combination of this information is used to illuminate a light to show "right" or "wrong" pedalling.

10 Claims, 1 Drawing Sheet

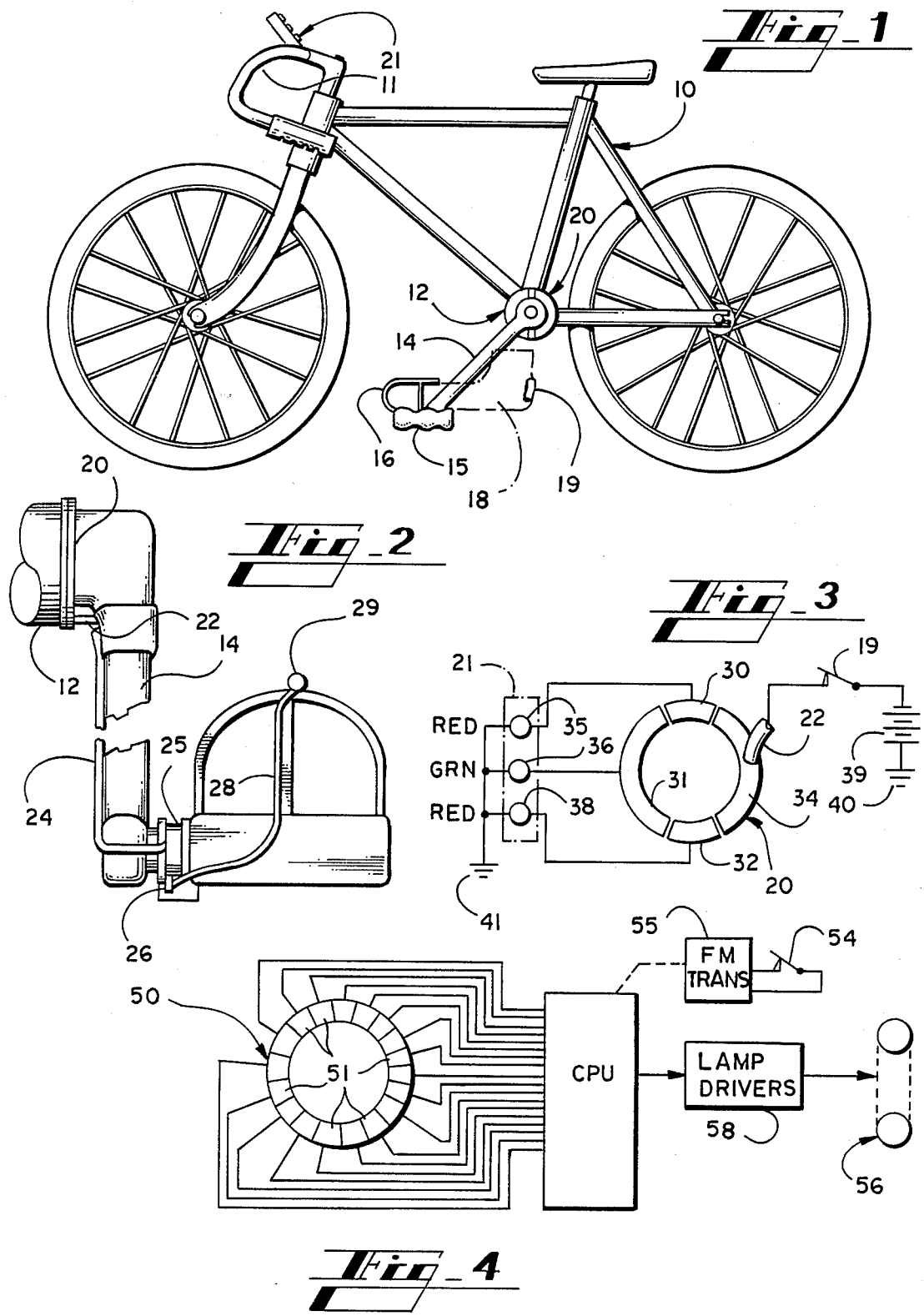

4,856,996

CYCLING PEDAL STROKE MONITORING SYSTEM

INFORMATION DISCLOSURE STATEMENT

In riding a bicycle, it is obvious that one should push downwardly as the pedal starts down, and should cease to push when the pedal starts up. Because the pedal moves in a circle, the precise down and up points are not easily determined, especially for the one riding the bicycle. In serious bicycling, as in races and the like, the precise arc through which one pushes down on the pedal becomes extremely important. Furthermore, in races and the like a cyclist conventionally utilizes toe clips or other means for attaching the foot to the pedal, and the cyclist actually pulls rearwardly and/or upwardly on the pedal when the pedal is not going down. This pulling on the pedal both assures that the cyclist is not pushing down when the pedal ought to be going up, and assists somewhat in causing appropriate rotation of the pedals.

Most cyclists are highly inefficient in their pushing and pulling on the pedals in that the cyclist tends to be somewhat off in his timing. It will of course be understood that a considerable amount of energy can be wasted when the cyclist's timing is not as it ought to be, based on pedal position.

The prior art means for assisting a cyclist to improve his stroke includes a specially equipped stationary bicycle having strain gauges or the like, the strain gauges being appropriately connected for input to a general purpose stationary computer. The computer is then programmed to provide information as to the points at which the cyclist begins to push, the points at which the cyclist begins to pull, etc. The computer output can therefore be used to inform the cyclist of his errors, but it is up to the cyclist himself to correct those errors through practice on a standard bicycle. While the cyclist is riding a conventional bicycle, however, there is no reminder or monitoring system to inform the cyclist of his progress.

SUMMARY OF THE INVENTION

This invention relates generally to monitoring systems, and is more particularly concerned with a monitoring system for informing a cyclist of his pedalling efficiency.

The present invention provides a monitoring system that is installable on a conventional bicycle for use when riding the bicycle in normal fashion. A pedal position indicating means is provided in conjunction with a push/pull switching means for providing input to a visual indicating means. The cyclist is informed by the visual indicating means as to whether he is pushing or pulling at the appropriate points in the pedal cycle.

In one embodiment of the invention, a plurality of light means is carried by the handlebar. If the cyclist is pushing on the downstroke of the pedal and pulling before and after the downstroke, the light means will indicate proper performance. If the cyclist fails to perform appropriately, the light means will so indicate.

BRIEF DESCRIPTION OF THE DRAWINGS

These and other features and advantages of the present invention will become apparent from consideration of the following specification when taken in conjunction with the accompanying drawings, in which:

FIG. 1 is a side elevational view showing a bicycle having the monitoring system of the present invention installed thereon;

FIG. 2 is an enlarged, front elevational view, partially broken away, showing one form of electrical connections from the bicycle frame to the pedals;

FIG. 3 is a schematic diagram showing the electrical connections for the arrangement shown in FIG. 2; and, FIG. 4 is a schematic diagram showing a modified form of the arrangement illustrated in FIG. 3.

DETAILED DESCRIPTION OF THE EMBODIMENTS

Referring now more particularly to the drawings, and to those embodiments of the invention here presented by way of illustration, FIG. 1 shows a generally conventional bicycle indicated at 10 having handlebars 11 and a journal 12 for the crank arms 14 carrying the pedals 15. Toe clips 16 are here illustrated as the means for fixing a shoe to a pedal; however, those skilled in the art will understand that the various clamping arrangements utilized in the cycling industry can easily be substituted for the toe clips 16, and all such apparatus is within the scope of the present invention.

It will be noted that there is a shoe 18 indicated in phantom, the rear of the shoe including a switch indicated at 19. For use with the switch 19, the hub 12 has a segmented slip ring 20 carried thereon; and, there is a light display panel 21 carried by the handlebars 11.

Since the switch 19 is at the rear of the shoe 18, it is contemplated that the switch 19 will be a normally-closed switch, and the switch will be opened when the foot is urged rearwardly against the switch. It will be understood that the switch 19 may also be in the sole of the shoe 18, or in the pedal of the bicycle. In this latter event, the switch may be a normally-open switch that will be closed when the rider pushed down on a pedal. The operations are generally the same and these and other variations will suggest themselves to those skilled in the art.

At this point it should be understood by those skilled in the art that the slip ring 20 is appropriately segmented to indicate pedal position to the extent desired. Whether the cyclist is pushing or pulling is determined by the switch 19; therefore, through the use of the slip ring 20 and the switch 19, the appropriate light on the panel 21 can be illuminated to inform the cyclist of his performance.

Looking now at FIG. 2 of the drawings, the slip ring 20 is shown fixed to the hub 12, and there is a brush 22 carried by the crank arm 14 to make electrical contact with the slip ring 20. The brush 22 is connected by a wire 24 to a pedal slip ring 25 at the end of the crank arm 14. A second brush 26 slides along the slip ring 25, the brush 26 being connected by a wire 28 to a jack 29.

While those skilled in the art will devise numerous constructional details, it will be seen that the arrangement shown in FIG. 2 allows transmission of an electrical signal from the jack 29, through the wire 28, and through the brush and slip ring 25 and 26 through the wire 24, and through the slip ring and brush 20 and 22, and to the stationary frame of the bicycle 10. By plugging the switch 19 into the jack 29, the desired information as to whether the cyclist is pushing or pulling can be transmitted to the bicycle frame and to the light panel 21.

Looking next at FIG. 3 of the drawings it will be seen that the slip ring 20 is segmented, and includes an uppermost segment 30, a forward segment 31, and a lower segment 32. There is also a rear segment 34, but this rear segment 34 is optional, and could possibly be formed integrally with the segments 30 and 31. It will also be seen in FIG. 3 that the light panel 21 includes three lights 35, 36 and 38. As designated in the drawings, the lights 35 and 38 are red, and the light 36 is green. While other colors may of course be used, the designated colors follow the convention wherein green is considered correct, and red is considered incorrect. The lights of course may be incandescent bulbs, LED's or other indicating means.

To provide power to the light means 21, there is here shown a battery 39, the battery being grounded at 40, with the opposite sides of the light bulbs 35, 36 and 38 also being grounded at 41. Those skilled in the art will understand that the battery and the lights might be grounded through the metalic bicycle if desired, or of course a pair of wires can be carried throughout the system. This is a matter of choice in the particular design, and it is thought that the presentation in FIG. 3 is adequate to understand the invention.

While the arrangement shown in FIGS. 2 and 3 operates quite well with the system of the present invention, it will be understood that the use of brushes and slip rings is somewhat limiting, and may be rather tedious to construct. An alternative arrangement is illustrated in FIG. 4 of the drawings where it will be seen that the slip ring 50 is divided into a very large number of segments 51. Each of the segments 51 is connected by a wire to a central processing unit 52.

In this construction, it is contemplated that each of the segments 51 will be a Hall-effect switch; and, instead of the brush 22 carried by the crank arm 14, there will be a magnet carried by the crank arm 14. Thus, without physical connection, the juxtaposition of a magnet on the crank arm will activate one of the Hall-effect switches in a segment 51 to indicate the position of the crank arm 14. This position information is then fed to the computer 52, and it will be understood that the additional segments in the slip ring 50 can be used for other computations, since the pedal position throughout the circle can be indicated.

The other piece of information required by the computer is whether or not the cyclist is pushing at any given time. FIG. 4 includes a switch 54 connected to an FM transmitter 55. The transmitter 55 is then shown as connected to the computer 52. The connection contemplated is that the transmitter 55 will transmit information to a receiver within the computer 52 so the computer 52 will know whether the switch 54 is open or closed. The switch 54, it will be understood, is the full equivalent of the switch 19 and will indicate whether the cyclist is pushing or pulling at any given instant.

With the arrangement shown in FIG. 4, it will be seen that the computer 52 will have information as to the rotational position of the crank arm 14, and will have information as to whether the cyclist is pushing or pulling on the pedals. With this information, the computer 52 will determine whether or not the cyclist is correct, and will illuminate appropriate lights on the light panel 21. In FIG. 4, there is shown a plurality of lamps 56, the lamps 56 being driven by the lamp drivers 58 from the computer 52.

From the foregoing description, operation of the device should be understandable. A cyclist should push on the pedal when the pedal is clearly moving downwardly, and should cease to push when the pedal no longer is clearly moving downwardly. The precise point to start pushing and to stop pushing might be determined by a specialist in the field, or by a cyclist through his own experience, or through some analysis as is available through the prior art systems. Once the points are determined, however, the slip ring 20 can be appropriately divided so that the segment 31 represents the arc through which the cyclist ought to be pushing on the pedal. The segments 30 and 32 can then be arranged for an area wherein the cyclist ought not to be pushing, but should be pulling.

Once the arrangement is determined, and installed on a bicycle, it will be understood that a cyclist can ride his conventional bicycle on a test track, on the open highway or other normal riding areas. Throughout the ride, the cyclist has the light panel 21 mounted on the handlebars for easy visibility. The light panel 21 will be a constant reminder of errors in pedalling, or will constantly reinforce correct pedalling. Thus, the important feature of the present invention is that the efficiency of the cyclist's pedalling is constantly monitored while the cyclist is riding in normal pleasure rides, practice rides or the like on the usual highways or test tracks. This fact allows the cyclist to be aware of his errors and attempt to alter the pedalling in a normal cycling environment and atmosphere, and under normal conditions.

By utilizing an arrangement such as that shown in FIG. 4 of the drawings, much more elaborate information can be provided to the cyclist. Again, the rotational position of the pedal is placed in conjunction with information as to whether the cyclist is pushing or pulling on the pedals, and a visual indication is provided to the cyclist to indicate "right" or "wrong" so the cyclist can immediately adjust his performance, or be reinforced in his performance.

It will therefore be understood that the present invention provides an extremely simple pedal monitoring device that is mountable on virtually any conventional bicycle. The present invention provides constant information as to the pedalling performance of the cyclist to allow the cyclist to develop good habits to conform to the desired pedalling technique.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. A pedal stroke monitoring system for informing a cycle rider as to performance in pedalling, pedals on the cycle being carried on crank arms moving in a circle and having a down stroke and an up stroke, said monitoring system including means for indicating pedal position, means for determining if said rider is pushing on a pedal, and visual indicating means within the normal visual field of said rider, said visual indicating means including a "right" indicator and at least one "wrong" indicator, the arrangement being such that, when said pedal is in a down stroke and said means for determining if said rider is pushing does indicate pushing, said "right" indicator is selected.

2. A pedal stroke monitoring system as claimed in claim 1, said means for indicating pedal position including a slip ring concentric with the circle of the pedals so that the pedals traverse said slip ring as the pedals move in a circle, said slip ring having a plurality of segments, at least one of said segments being located to be traversed on the down stroke of the pedal, and at least one of said segments being located at an end of the down stroke.

3. A pedal stroke monitoring system as claimed in claim 1, said means for determining if said rider is pushing on a pedal including switch means located for actuation by the foot of the rider during the pedalling cycle.

4. A pedal stroke monitoring system as claimed in claim 3, said means for indicating pedal position including a slip ring concentric with the circle of the pedals so that the pedals traverse said slip ring as the pedals move in a circle, said slip ring having a plurality of segments, at least one of said segments being located to be traversed on the down stroke of the pedal, and at least one other of said segments being located at an end of the down stroke.

5. A pedal stroke monitoring system as claimed in claim 4, and further including a brush carried by the crank arm for engagement with said slip ring, said switch means being connected in series with said brush and slip ring.

6. A pedal stroke monitoring system as claimed in claim 5, said visual indicating means comprising a light panel and a plurality of lights thereon, said lights being connected in series with said slip ring and said switch means.

7. A pedal stroke monitoring system as claimed in claim 6, said at least one segment on said slip ring being connected in series with said "right" indicator.

8. A pedal stroke monitoring system as claimed in claim 4, each segment of said plurality of segments comprising a switch, and further including switch operating means carried by said crank arm so that switches of said slip ring are actuated when passed by said crank arm.

9. A pedal stroke monitoring system as claimed in claim 8, said switch comprising a Hall-effect switch, said operating means comprising a magnet.

10. A pedal stroke monitoring system as claimed in claim 3, said switch means being mounted within the shoe of the rider for sensing rearward movement of the foot of the rider.

* * * * *